Figure 5:
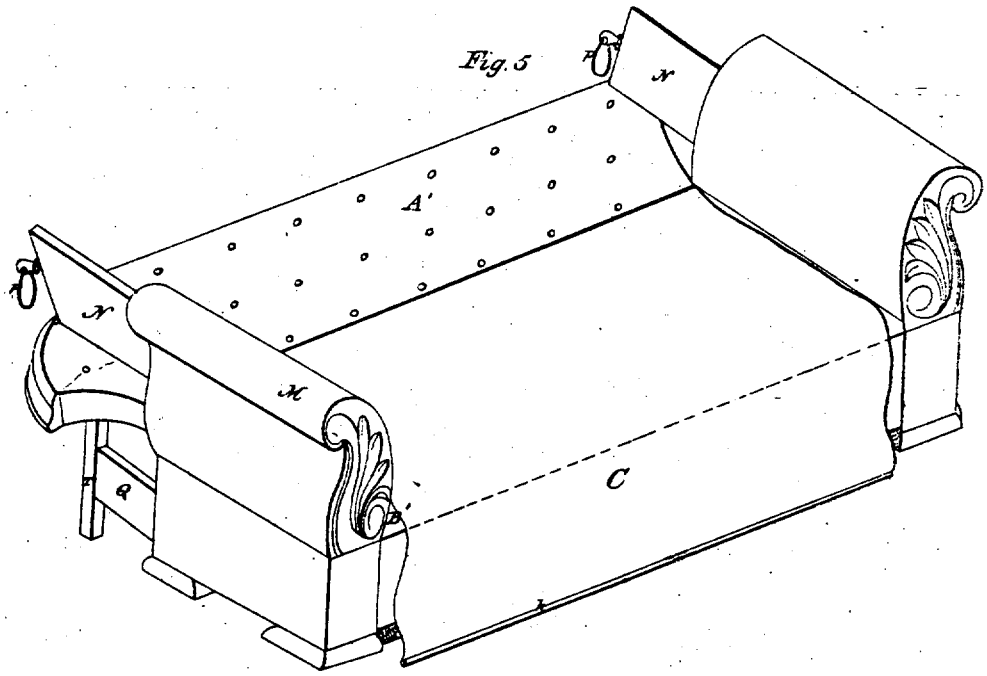

5-40 AU 35E FX
FIPS 309 OR PE 185
BEST AVAILABLE COPY
Sheet 1-2 Sheets.
R. Scarritt,
Sofa Bedstead.
No. 185.
Reissued Jan. 7, 1851.
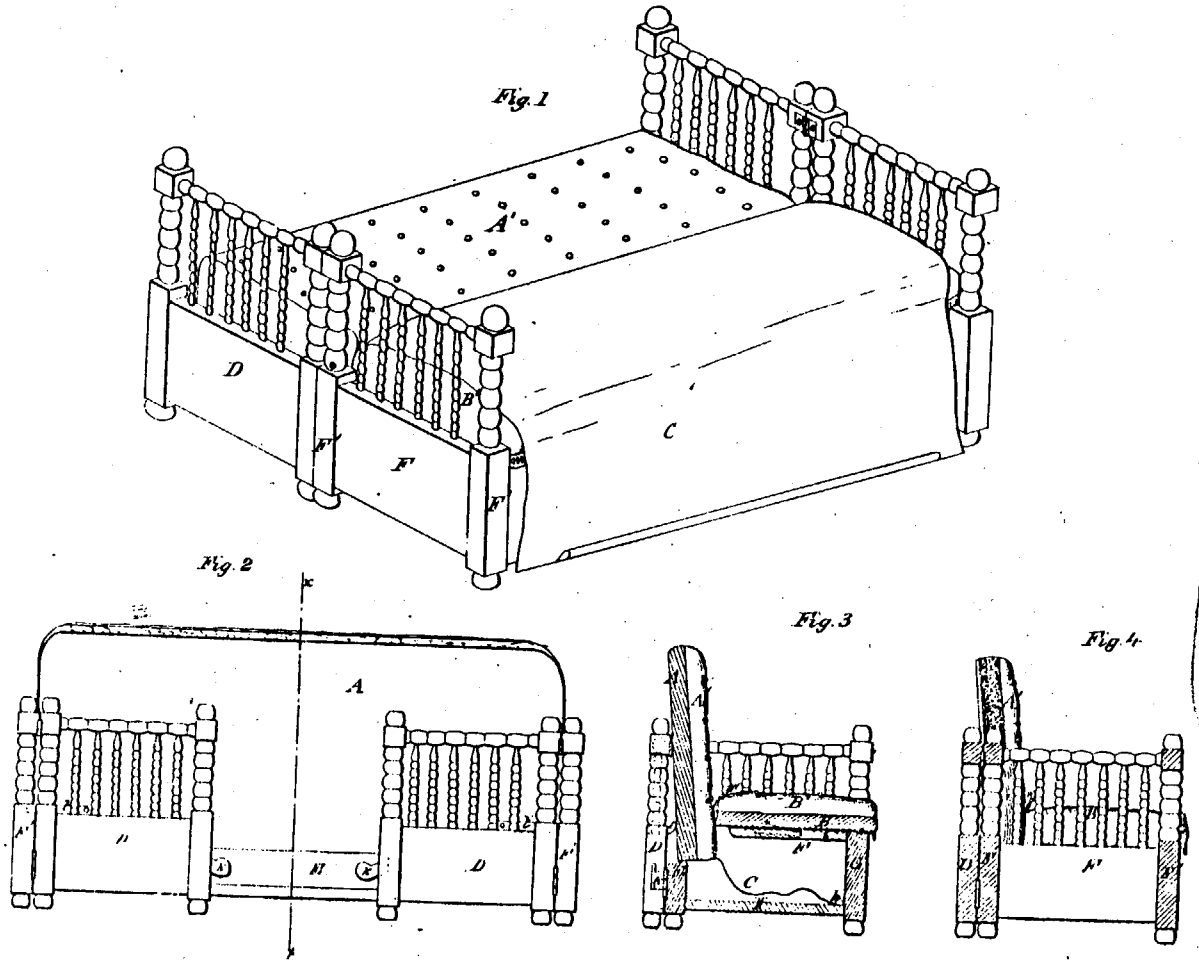
THE NORRIS PETERS CO., WASHINGTON, D. C.

BEST AVAILABLE COPY

Sheet 2-2 Sheets

R. Scarritt,

Sofa Bedstead,

No. 185.

Reissued Jan. 7. 1851.

H. PETERS, PHOTO-LITHOGRAPHER, WASHINGTON, D. C.

BEST AVAILABLE COPY

UNITED STATES PATENT OFFICE.

RUSSELL SCARRITT, OF ST. LOUIS, MISSOURI.

IMPROVEMENT IN SOFA-BEDSTEADS.

Specification forming part of Letters Patent No. 7,707, dated October 8, 1850; Reissue No. 185, dated January 7, 1851.

*To all whom it may concern:*

Be it known that I, RUSSELL SCARRITT, of the city and county of St. Louis, in the State of Missouri, have invented certain new and useful improvements on a piece of furniture called a "sofa-bed," which can at will be converted into either a sofa or a bed; and I do hereby declare that the following is a full and exact description thereof, reference being had to the accompanying drawings, making a part of this specification, in which—

Figure 1 is a perspective view of the said piece of furniture in the form of a bed, and Figs. 2, 3, and 4 are views of the same when converted into a sofa, Fig. 2 being an elevation of the rear side thereof, Fig. 3 a vertical transverse section in the line *x x* of Fig. 2, and Fig. 4 an elevation of its ends.

Similar letters indicate like parts in all the figures.

A box composed of the top B, the front side, G, the ends F F, the rear side, E, and the bottom H is the nucleus upon which I construct my improved sofa-bed. The sides and ends of the said box are joined together by means of the corner-posts F′ F′, which rise above the box a sufficient distance to form supports for the ends of a sofa. The top B of the nucleus, box is hinged to the upper edge of the front side, G, thereof, and its ends rest upon the cleats *i i*, which are made fast to the inner sides of the ends of the box. A frame, A, is suspended by pivots between the rear corner-posts, F′ F′, of the nucleus-box, as shown in Figs. 2 and 3. The pivots that support the frame A project from the plates *t t*, Fig. 2, which plates are secured to the rear side of the said frame some distance above its lower edge, the reason of which position of the said pivot-plates will be hereinafter set forth. A mattress, B′, is secured to the upper side of the top B of the box, and a mattress, A′, is secured to the front side of the frame A, the mattress B′ serving as the seat and the mattress A′ as the back of a sofa when they are placed in the positions shown in Figs. 2, 3, and 4, and the two mattresses serving as a bed when the mattress A′ is placed in the position shown in Fig. 1. Frames D D, corresponding in size and shape with the sofa ends, (that rise from the ends F F of the nucleus-box,) are hinged to the rear corner-posts, F′ F′, as shown in the drawings. When the mattress A′ is thrown into a vertical (or an inclined) position to convert the piece of furniture into a sofa, the frames D D are swung inward against the back A of the mattress, and by means of the buttons *k k* (secured to the rear side, E, of the box) the frames D D are retained in that position, and thereby securely retain the mattress A′ in its proper position for forming the back of a sofa. The rear edge of the mattress B′ abuts firmly against the mattress A′, when the latter forms the back of a sofa, (as above described,) and thereby aids in retaining it in this position. When it is desired to throw the mattress A′ and the frames D D into such positions as to form with the mattress B′ and the sofa ends a capacious and handsomely-proportioned French-shaped bedstead covered with mattresses, the frames D D are first unfastened and thrown outward into a line with the sofa ends. The rear edge of the mattress B′ is then elevated (by means of the loop *w*) to permit the mattress A′ to be thrown back into a horizontal position, in which position its ends will rest upon the cleats *l l*, Fig. 3, which are secured to the inner sides of the frames D D. When the mattress A′ is thrown backward into a horizontal position, its inner edge will be thrown forward so as to closely abut against the rear edge of the mattress B′, as shown in Fig. 1, and form a close, even, and elastic joint between the two, in consequence of the projection of the lower or inner edge of the said mattress A′ beyond its supporting-pivots *t t* a distance equal to the thickness of the mattress B′ and the top B of the box to which it is secured, by which means a much greater width is given to the bed than the visible surface of the sofa back and seat, thus making a double bed of usual width, while the usual proportions of a sofa are retained. This arrangement is very important, as without it the bed must be too narrow, or the sofa back and seat be made of unusual, ungraceful, and disproportionate widths. The back A being partly balanced on its pivots *t t*, enables its position to be

BEST AVAILABLE COPY changed with much less power than would be required were its pivots located at its extreme inner edge. This improved manner of hanging and arranging the mattresses A′ and B′ allow of springs being introduced in their manufacture, by which construction they will form one of the pleasantest of sofas or most luxurious of beds, without the addition of feather-beds or extra mattresses. The back and seat of the sofa, by this arrangement, being of sufficient width to form the bed—when that shape is desired with this piece of furniture—the space under the sofa-seat is left free and unoccupied, and may be appropriated to the storing of the bed-covering, or be used for other purposes. The height of the bed form of this sofa-bed is about the same as that of a French bedstead, and is not lessened by changing it from a sofa to a bed, as is the case with many other sofa-beds.

The construction of my improved sofa-bed is so simple that it can be made so very strong that it will be almost impossible for it to get out of order.

In economy of construction this piece of furniture is believed to be far in advance of anything of the kind that has ever been constructed.

Figure 6:
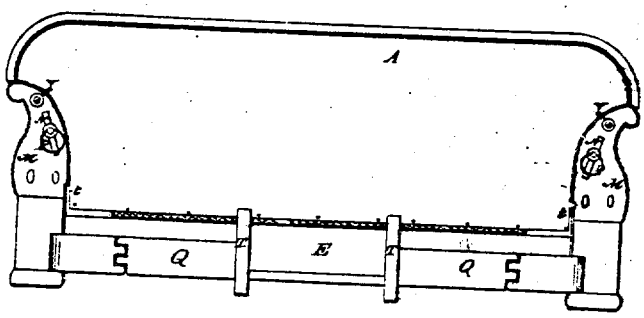

Sheet 2, Figs. 5 and 6 represent a modified form of my sofa-bed. In this modification the nucleus-box and the mattresses A′ and B′ are constructed and combined with each other in substantially the same manner as before described. The sofa ends M M, that rise from the ends of the nucleus-box, in this modification are of a scroll-shape. The mattress frame A is suspended between them on the pivots *t t*, which pivots have the same relative position upon the mattress-frame as that before described, and represented in Fig. 2. The mattress-frame A is retained, when it is placed in an elevated position, to form a sofa-back, by means of the buttons *v v*, Fig. 6, on the rear edges of the sofa ends, and it is supported, when in a horizontal position, by means of the legs *r r*, which are attached to the ouert ends of the arms Q Q, that are hinged to the back E of the nucleus-box, as shown in the drawings. When this form of sofa-bed is converted into a sofa, the legs *r r* and arms Q Q are folded inward against the back of the box, as shown in Fig. 6. Sliding boards N N are let into receptacles formed in the sofa ends M M, which are drawn out when the mattress A′ is placed in a horizontal position (to convert the sofa-bed into a bed) for the purpose of forming the head and foot boards opposite this mattress; and when the mattress A′ is elevated to form the sofa-back these sliding boards N N are pushed into the receptacles in the sofa ends, as shown in Fig. 6. An apron, C, made of canvas or other suitable material, and having a stiffening-rod, *h*, confined to its outer edge, has its inner edge made fast to the inner edge of the mattress A′, as shown in Fig. 3, which apron C serves the following purpose, to wit: The sheets, pillows, and bed-covering are placed on the apron within the nucleus-box when they are not required for use, and when their use is required the mattress-frame B is raised upon its hinges, the rod *h* taken hold of by the hand and drawn with the apron out of the box, which movement will throw the pillows, sheets, and bed-covering out onto the mattress A′. The apron C is then spread over the mattress B′, and the sheets, &c., are spread over both mattresses.

When it is desired to change the sofa-bed from a bed to a sofa, the stiffening-rod *h* in the outer edge of the apron C is raised and carried back so as to throw all the bed-covering and the pillows on the mattress A′. The mattress B′ is then raised upon its hinges, and while it is an elevated position the mattress-frame A is turned upward, which movement of the apron and mattress-frames will deposit the apron C, with the pillows and bed-covering inclosed therein, within the nucleus-box.

What I claim as my invention, and desire to secure by Letters Patent, is—

1. The combination of the frames D D, which are of the same form as the sofa ends F F, with the said sofa ends, substantially in the manner and for the purpose as herein set forth—to wit, when the back A is elevated to convert the sofa-bed into a sofa, the frames D D must be swung inward against the sofa-back to retain it in an elevated position, and to throw the said frames out of the way and out of sight, and when it is desired to change the sofa-bed from a sofa to a bed the said frames D D can only be swung outward into a line with the sofa ends F F, so that the ledges *l l* on the inner sides of the same will unerringly catch and retain the back A when it reaches a horizontal position as it is thrown backward, in which position the sofa ends F F and the swinging frames D D will form an ornamental and uniform head and foot to the bed form of my improved sofa-bed.

2. The placing of the pivots *t t*, which suspend the mattress-frame A, such a distance from the lower or inner edge of the same that when the said mattress-frame is thrown backward into a horizontal position the lower or inner edge of the mattress A′ will by that movement be thrown forward and press against the rear edge of the mattress B′ with such force as to form a close and an elastic joint between the two, and thereby furnish an extra width to the bed form of my improved sofa-bed, substantially in the manner herein set forth.

3. The projection of the mattress A′ below the pivots that it turns upon, in combination with the movement of the mattress B′

BEST AVAILABLE COPY on hinges located at its front edge, by means of which a firm and close joint is formed between the rear edge of the mattress B′ and the face of the mattress A′ when they are arranged in the form of a sofa, which joint aids in retaining the said mattress A′ in an elevated position, substantially as herein set forth.

The above specification of my improved sofa-bedstead signed this 20th day of November, 1850.

RUSSELL SCARRITT.

Witnesses:
ROBT. P. AYLES,
Z. C. ROBBINS.